April 27, 1965  M. E. FISHER  3,180,318
ADJUSTABLE QUANTITY DISCHARGE ANIMAL FEEDING APPARATUS
Filed June 28, 1963  3 Sheets-Sheet 1
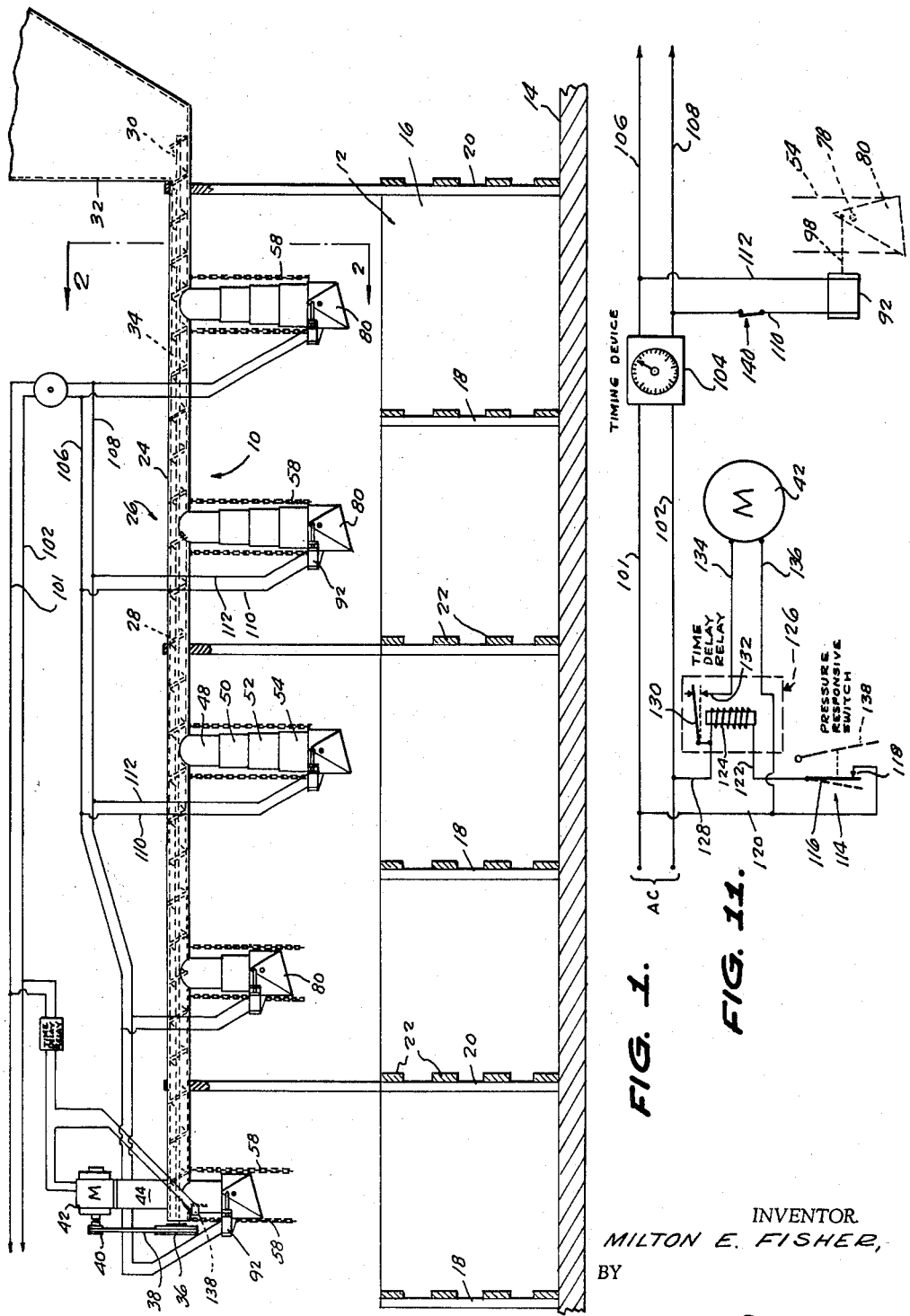
INVENTOR.
MILTON E. FISHER,
BY
McMorrow, Berman & Davidson
ATTORNEYS.

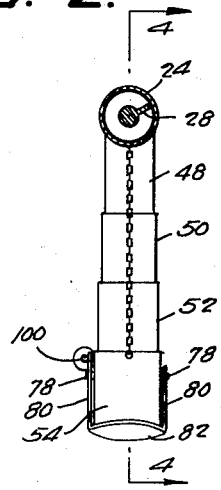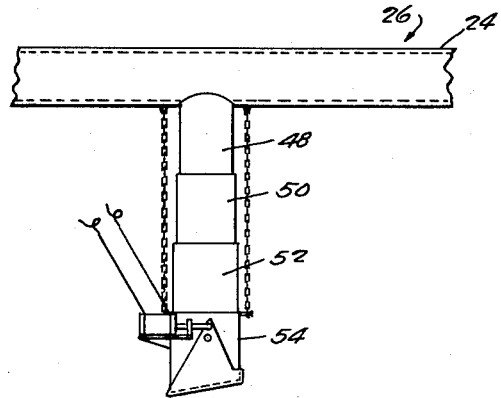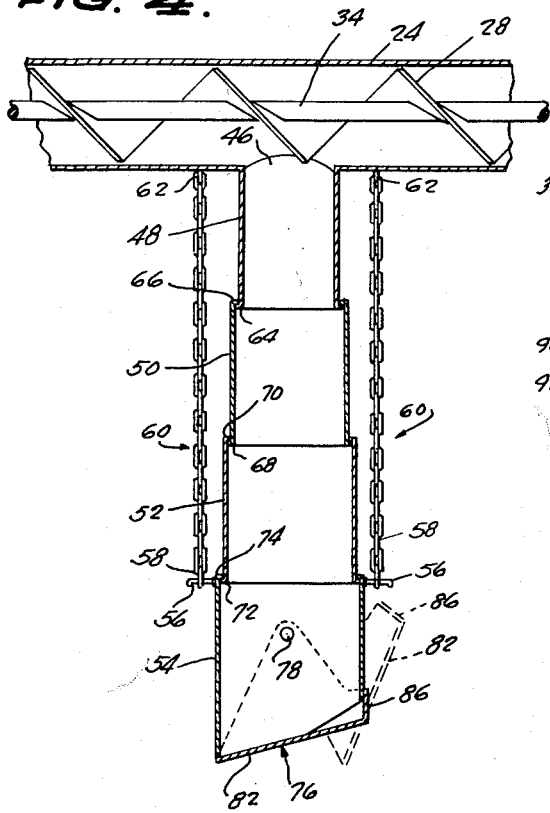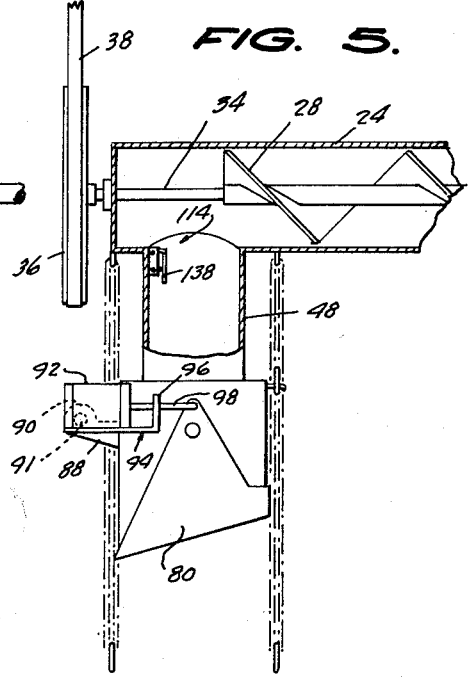

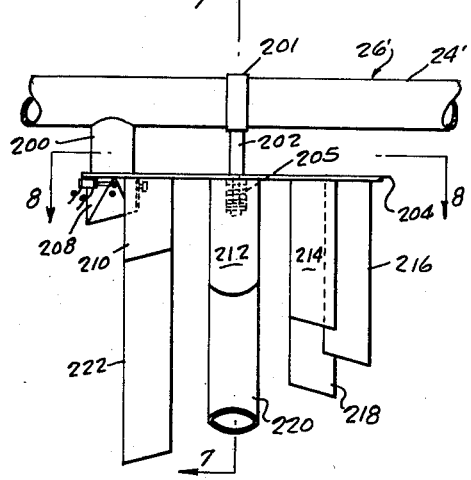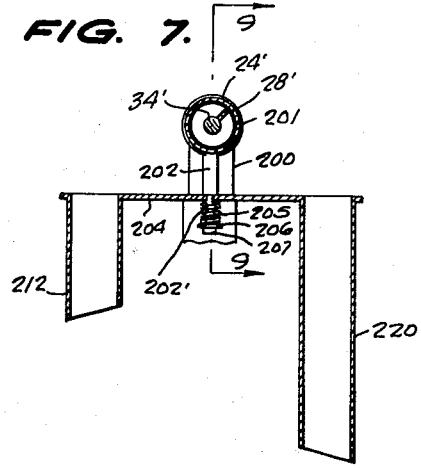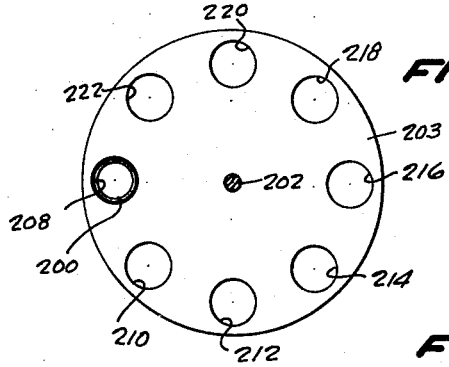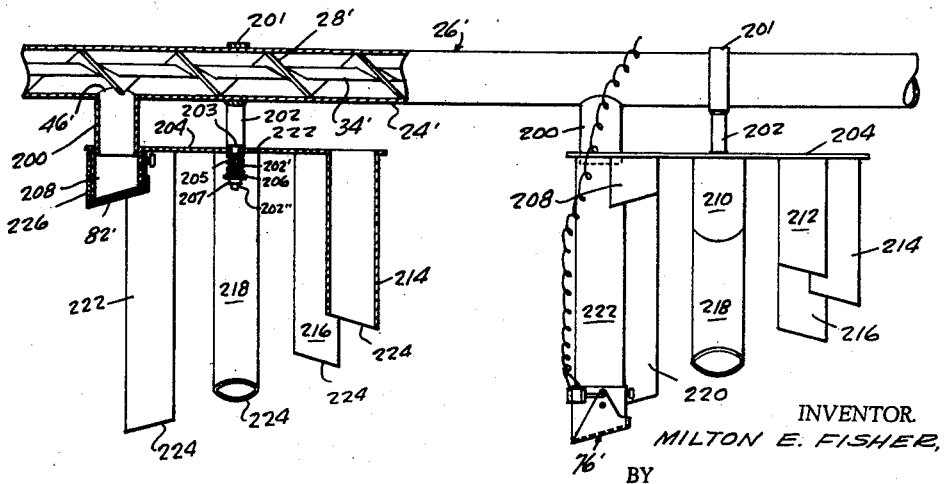

United States Patent Office 3,180,318
Patented Apr. 27, 1965

3,180,318
ADJUSTABLE QUANTITY DISCHARGE ANIMAL
FEEDING APPARATUS
Milton E. Fisher, R.R., Denver, Iowa
Filed June 28, 1963, Ser. No. 291,433
10 Claims. (Cl. 119—56)

This invention relates to the general field of animal husbandry and, more specifically, to animal feeding means.

One of the primary objects of this invention is to provide time-controlled means for automatically delivering feed to animals at periodic intervals.

Another object of this invention is to provide time-controlled means for automatically delivering a predetermined amount of feed to animals.

A further object of this invention is to provide time-controlled means for delivering pre-selected amounts of feed to a plurality of pre-selected stations such as, for example, a plurality of separate hog pens.

Still another object of this invention is to provide a hog-feeding device of an automatic type, the device being suspended over a plurality of separated hog pens and includes means for delivering to each pen a pre-selected amount of food at a pre-selected time.

A further object of this invention is to provide livestock feeding means which requires infrequent attendance by but a single operator and which will deliver food at longitudinally-spaced stations at regularly-spaced intervals and in predetermined amounts.

Still another object of this invention is to provide an Archimedean or helicoidal screw conveyor for feeding livestock, together with axially-spaced discharge stations having time-controlled electrically-operated closure means operable for movement to the respective open positions to permit discharge of said food in accordance with the timing means.

This invention contemplates, as a still further object thereof, the provision of livestock feeding apparatus of the type to which reference has been made generally above, the apparatus being non-complex in construction and assembly, relatively inexpensive to manufacture and maintain, which is durable in use.

Other and further objects and advantages of the instant invention will become more evident from a consideration of the following description when read in conjunction with the annexed drawings, in which:

FIGURE 1 is a side elevational view of animal-feeding apparatus according to this invention, FIGURE 1 showing the same as being installed above a plurality of livestock pens;

FIGURE 2 is an enlarged side elevational view of the food volume-control means, FIGURE 2 being taken substantially on the vertical plane of line 2—2 of FIGURE 1, looking in the direction of the arrows;

FIGURE 3 is a side elevational view of the apparatus shown in FIGURE 2, FIGURE 3 having been turned 90° from the position shown in FIGURE 2;

FIGURE 4 is an enlarged detail cross-sectional view, FIGURE 4 being taken substantially on the vertical plane of line 4—4 of FIGURE 2;

FIGURE 5 is an enlarged fragmentary, detail cross-sectional view of a portion of one end of the conveyor system;

FIGURE 6 is a side elevational view illustrating a second embodiment of this invention;

FIGURE 7 is a detail cross-sectional view, FIGURE 7 being taken substantially on the vertical plane of line 7—7 of FIGURE 6, looking in the direction of the arrows;

FIGURE 8 is a detail top plan view, partly in section, FIGURE 8 being taken substantially on the horizontal plane of line 8—8 of FIGURE 6, looking in the direction of the arrows;

FIGURE 9 is a side elevational view of the feeding apparatus shown in FIGURE 6, FIGURE 9 being partially broken away to show the association of its several component elements;

FIGURE 10 is a perspective view of the food volume-control means detachably connected in the embodiment of the invention illustrated in FIGURE 6; and FIGURE 11 is a schematic wiring diagram for the time-controlled, electrically-actuated conveyor means and feed-closure means.

Referring now more specifically to the drawings, reference numeral 10 designates, in general, animal-feeding apparatus constructed in accordance with the teachings of this invention. The feeding apparatus 10 has been designed for utility in connection with livestock (not shown) normally housed in separate pens or compartments designated by reference numeral 12. Preferably, the pens or stalls 12 include an elongated substantially rectangular base 14 from which arises a plurality of oppositely disposed side walls 16 (only one being shown) and a plurality of rail supports 18 and standards 20. Extending transversely of the rail supports 18 and the standards 20 are a plurality of vertically-spaced rails 22. The side walls 16 taken together with the rails 22 cooperate to define the individual pens or stalls 12.

As is seen in FIGURE 1, the standards 20 project above the uppermost ones of the rails 22 and support thereon an elongated substantially cylindrical housing or casing 24 of a helicoidal conveyor denoted, generally, by reference numeral 26. Disposed within the casing 24 is an Archimedean or helical screw 28. As is seen in FIGURE 1 of the drawings, the helicoidal screw 28 extends axially substantially throughout the casing or housing 24 and has a projecting end 30 which extends within the lower end of a conventional hopper indicated at 32. The hopper 32 is connected with the casing or housing 24 in the conventional manner.

The helical screw or conveyor 26 includes the drive shaft 34 having an end thereof projecting beyond that end of the housing or casing 24 oppositely-disposed with respect to the hopper 32 in order to fixedly receive thereon a driven pulley 36 which is placed in driving connection through the endless pulley belt 38 with the drive pulley 40 driven by the electric motor 42. The motor 42 may be placed at any advantageous point and is illustrated in the drawings as being supported on the housing or casing 24 by means of a motor block 44.

The housing or casing 24 on the underside thereof is interrupted at axially-spaced intervals by cut-outs 46 which are positioned substantially centrally of each pen or stall 12. As is seen in FIGURES 1 and 4, the underside of the housing or casing 24 has fixedly secured thereto or integrally-formed therewith one end of a depending substantially hollow, cylindrical tube 48 over which is telescoped a similar tube 50. A similar tube 52 is telescoped over the tube 50, and over the tube 52 is telescoped a final tubular member 54, also being substantially cylindrical in construction. The tubular member 54 carries a pair of radially-extending diametrically-positioned exterior lugs 56 which are adapted to be selectively engaged within a pre-selected link 58 of a pair of identically-constructed chains 60. As is clearly shown in FIGURE 4, the uppermost links 58 are fixedly secured on hooks 62 which depend from the housing or casing 24 on opposed sides of the telescoped tubular members 48, 50, 52 and 54.

As is seen in FIGURE 4, the lower end of the tubular member 54 lies in a plane making an acute angle with a horizontal plane.

As is also seen in FIGURE 4, the lower end of the tubular member 48 is formed with an outwardly-turned peripheral flange 64 which is adapted to engage with an inwardly-turned peripheral flange 66 disposed at the upper end of the tubular member 50 to prevent disconnection between the tubular members 48, 50. In a similar manner, the lower end of the tubular member 50 is provided with an outwardly-turned peripheral flange 68 which is adapted to engage and hold the peripheral flange 70 which extends inwardly at the upper end of the tubular member 52. The lower end of the tubular member 52 has an outwardly-turned peripheral flange 72 adapted to be engaged by the inwardly-turned peripheral flange 74 formed on the upper end of the tubular member 54.

Reference numeral 76 generally designates closure means for the lower end of the tubular member 54. The closure means 76 is seen to include a pair of laterally-projecting, diametrically-opposed pivot pins 78 fixedly secured to the tubular member 54 from which depend, respectively, a pair of substantially triangular support members 80. As is seen in the several figures of the drawings, the pivotal connection is made between the supports members 80 and the pivot pin 78 substantially at the apex of the support members. A closure wall 82 extends between the support members 80 at their respective base ends, and as is clearly shown in FIGURES 3, 4, and 5, the closure wall 82 is provided with an arcuate flange 86 which normally extends partially around the shorter side of the tubular member 54 when the closure means 76 is in its normally closed position across the lower end of the tubular member 54.

Reference numeral 88 designates a bracket fixedly secured to the tubular member 54 adjacent the upper end thereof, the bracket being provided at its outer end with an enlarged boss 90. Suitable means including a pivot pin 91 (see FIGURE 5) connects one end of an electromagnet 92 for pivotal movement in the boss 90, and integrally-connected with the electromagnet 92 is a substantially L-shaped guide member 94 having a foot portion 96 which receives the armature 98 for reciprocation therethrough. The other end of the armature 98 is bent inwardly (see FIGURE 2) to form a hook portion 100 which is pivotally connected to the apex of one of the support members 80. The construction is such that upon energization of any one of the electromagnets 92 the armature 98 thereof will be retracted, reference being made to FIGURE 5, and the support members 80 will pivot in a counterclockwise direction moving the closure means 76 from the full-line position shown in the figures to its dotted-line position as illustrated in FIGURE 4. Upon de-energization of the electromagnets 92, the closure means 76 will return to their respective closed positions under the force of gravity. In so moving, the armatures 98 are withdrawn to their normally extended positions.

Referring now to FIGURES 1 and 11, reference numerals 101 and 102 designate a pair of lines connected with an A.C. source at one of their respective ends. The other ends of the lines 101 and 102 connect with a connect with a conventional electrically-operated timing device or switch 104 having an output circuit which includes the wires 106, 108. Wire leads 110, 112 connect the electromagnets 92 with the wires 106, 108. The timing switch 104 is normally open and is set to close at a predetermined time or intervals of time, thereby energizing the lines 106, 108 and consequently, the electromagnets 92 through the leads 110, 112 to cause the closure means 76 to move to its open or dotted-line position, as is shown in FIGURE 4.

Reference numeral 114 denotes a normally open conventional pressure-responsive single-pole, single throw, micro-switch which is suitably mounted within the upper end of that tubular member 48 remotely-disposed with respect to the hopper 32. The switch 114 includes the usual movable switch arm 116 and a fixed contact 118. The fixed switch contact 118 connects through wire 120 with the line 101 and the switch arm 116 connects through wire 122 with one side of a solenoid 124 of a conventional time-delay relay switch 126.

The other side of the solenoid 124 connects through wire 128 with the line 102. The wire 128 also connects with the movable switch arm 130 of the time-delay relay switch 126, the switch arm 130 being adapted to close against the fixed switch contact 132. The fixed switch contact 132 connects through wire 134 with one side of the electric motor 42, the other side of the motor 42 connecting through wire 136 with the wire 120.

Means for operating the switch arm 116 of the micro-switch 114 is schematically shown in dotted lines in FIGURE 11, and could comprise any conventional means. The means for operating the switch arm 116 is designated at 138 and becomes operative to open the switch 114 as feed is delivered to the remotely-disposed one of the tubular members 48.

Having described and illustrated the component elements of one embodiment of this invention, the operation thereof is as follows:

Let it be assumed that the lines 101 and 102 are not energized, that the tubular members 48, 50, 52 and 54 for each stall 12 are empty, and that the hopper 32 is filled with livestock feed (not shown). Under these circumstances, the pressure-responsive switch 114 will be under its normal bias causing the switch arm 116 to engage against the fixed switch contact 118.

The operator now adjusts the tubular members 48, 50, 52 and 54 relative to one another to receive therein a desired amount of livestock feed which is to be delivered to each of the pens or stalls 12.

The timing device 104 is now set for the desired feeding time, and the lines 101, 102 are now energized. Since the pressure-responsive switch 114 is closed, the solenoid 124 is energized, closing the time-delay relay switch 126 to the motor 42. The motor 42 operates the screw 28 causing the food to be drawn from the hopper 32 and pushes the same along the casing 24 for discharge throughout the cut-out 46 into one or more of the tubular members 48, 50, 52 and 54, the volume of food being deposited therein being dependent upon their adjustment relative to each other. As the food accumulates in those tubular members at that end of the conveyor 26 remotely-disposed with respect to the hopper 32 and builds up in the upper tubular member 48 thereof, pressure of the feed acting on the lever 138 or other pressure-responsive means, causes the switch arm 116 to move out of contact with the fixed switch contact 118, thereby de-energizing the solenoid 124, allowing the switch arm 130 to move out of contact with the fixed switch contact 132 and open the circuit to the motor 42 to stop the drive to the conveyor 26.

At a fixed or predetermined time, as set by the operator on the time switch 104, after the tubular members 48, 50, 52 and 54 have been filled, the wires 106, 108 are energized, causing the electromagnets 92 to be substantially simultaneously energized. This operates the closure means 76 to cause the same to move from under their lower ends of the associated tubular members 54, that is, they move from the full-line position shown in FIGURE 4, to the dotted-line position thereof, whereby the feed within the tubular members may be discharged therefrom under the force of gravity. After a predetermined time the timing switch or device 104 opens the circuit to wires 106, 108 de-energizing the electromagnets 92 to allow the closure means 76 to close under the force of gravity.

It will be recognized, of course, that as the feed descends out of the tubular member 48 which is remotely-disposed with respect to the hopper 32, the pressure-responsive switch 114 closes to establish the above-described circuit to the time-delay relay switch 126. This switch is so timed as not to close the circuits of the motor 42 until the electromagnets 92 have been deenergized in order to prevent food wastage. As soon as the time-delay switch 126 closes, the above-described cycle of operation is repeated.

Each of the electromagnets 92 may be plugged in through conventional means (not shown) to the lines 106, 108, or one of the wires 110, 112 may include a simple conventional single-pole, single-throw control switch indicated at 140 in FIGURE 11. This control switch provides selective means controlling the solenoid 92 with which it is associated. Thus, if the switch 140 is in its open position, the solenoid connected in circuit will not be energized and the closure means 76 will remain in its closed position.

FIGURES 6 to 10, inclusive, illustrate a second embodiment of this invention, the elements thereof finding counterparts in the first embodiment, and are differentiated therefrom through the addition of a prime mark to an identical reference numeral.

Thus, 26' designates a screw conveyor having a housing or casing 24' in which is rotatably supported the conventional conveyor screw 28' carried on a shaft 34'. One end of the conveyor 26' extends into a feed hopper (not shown) as before, and the shaft 34' is driven in the manner previously described, and, thereby drives the screw conveyor 28'. The underside of the housing or casing 24' is provided with a plurality of axially-spaced cutouts 46' from the peripheral marginal edges of which depend feed-discharge spouts 200.

The housing or casing 24', at longitudinally-spaced intervals, has fixedly secured thereto hanger collars 201 from which depend, respectively, stems 202 reduced in diameter at 202' and threaded as at 202". In reducing the stem 202 a shoulder 203 is inherently formed. Rotatably supported on the reduced portion 202' of each stem 202 is a discoidal plate 204 which abuts the shoulder 203 and is held thereagainst by helicoidal spring 205 which surrounds the reduced portion 202' and has a lower end abutting against a washer 206 held in place by a nut 207.

A plurality of circumferentially-spaced hollow tubular members 208, 210, 212, 214, 216, 218 and 220 depend from each discoidal plate 204 and open therethrough. Each of the tubular members varies from the others in volumetric capacity, but each of these hollow tubular members has the same diameter. The plate 206 is adapted to be depressed against a spring 205 for rotation about the reduced stem portion 202', and each of the spouts is disposed in the rotary path of movement of one of the plates 204 in such a manner that the tubular members 208, 210, 212, 214, 216, 218 and 220 may be rotated therebelow and aligned therewith. The arrangement is such that the operator, after having first rotated the plate 204 to position a selected one of the tubular members below the spout 200, releases the plate which now moves upwardly for abutment against the shoulder 203 while simultaneously telescoping a selected one of the hollow tubular members over the spout 200, as shown in FIGURE 9. This, of course, holds the plate 204 against accidental or inadvertent rotation through bodily contact therewith or from other causes such as, for example, vibrations developed in the machine as the helicoidal screw 28' is turned.

The open lower end of each of the tubular members 208, 210, 212, 214, 216, 218 and 220 is cut at an acute angle, such as is designated at 224, and the selected one of the hollow tubular members is telescopically fitted with a substantially hollow, cylindrical element 226 (see FIGURE 10) having a lower end cut substantially at the same angle as the lower ends 224 of the hollow tubular members. The element 226 may be held to the selected one of the hollow tubular members by means of one or more set screws 228.

A bracket 230 is fixedly secured to the hollow cylindrical element 226, and as before, the bracket 230 pivotally supports an electromagnet 92' having an armature 98'. The outer end of the armature 98' is pivotally received in the apex of one of a pair of substantially triangular support members 80' pivotally connected at 78' on the hollow cylindrical element 226. A closure wall 82' extends between the support walls 80' and is normally positioned against the lower end of the cylindrical element 226 to close the same.

As in the preceding embodiment of this invention, the spout 200 remotely-disposed from the feed hopper is provided with a pressure-responsive switch (not shown) and functions in the same manner as the pressure-responsive switch 114. The wires 110', 112' connect with the lines 106, 108 in the same manner as described above, whereby the electromagnets 92' are operated in the manner previously described to effect operation of the closure members 76' whereby food is discharged from any one of the selected ones of the tubular members 208, 210, 212, 214, 216, 218, 220 and 222.

Having described and illustrated two embodiments of this invention in detail, it will be understood that the same are offered merely by way of example, and that this invention is to be limited only by the scope of the appended claims.

What is claimed is:

1. Livestock feeding apparatus comprising an elongated conveyor including an elongated housing having a helicoidal screw extending axially therethrough, feed hopper means in open communication with one end of said housing, drive means connected with said screw, said drive means being disposed adjacent the other end of said conveyor, said housing having a plurality of axially-spaced downwardly-opening cut-outs extending transversely therethrough, a first substantially hollow open-ended tubuar member depending from the peripheral marginal edge of each cut-out, a plurality of telescoped substantially hollow second tubular members telescopically mounted on each of said first-named members, said second tubular members being expansible and retractable relative to said first tubular members, closure means extending across the lower end of the lowermost one of each of said hollow tubular members, and means operable to effect movement of said closure member to open said lower ends of said lowermost ones of said hollow tubular members.

2. Livestock feeding apparatus as defined in claim 1, wherein said closure means includes a closure wall extending across said lower ends of said second hollow tubular members, support members for each of said closure walls, said support members being pivotally connected with each of said second hollow tubular members and connected with said closure walls adjacent the lower ends of said support members, and electromagnetic means supported on said second hollow tubular members, said electromagnetic means including armatures connected with one of said support members above said pivotal connection, and said electromagnetic means being operable upon energization to move said armatures and thereby pivot said closure walls from across the lower ends of said second hollow tubular members.

3. Livestock feeding apparatus comprising an elongated housing having a helicoidal screw extending axially therethrough, feed hopper means in open communication with one end of said housing, drive means connected with said screw, said drive means comprising an electric motor, said housing having a plurality of downwardly-opening axially-spaced cut-outs extending transversely therethrough, a first open-ended substantially hollow tubuar member depending from the peripheral marginal edge of each of said cut-outs, a plurality of telescoped substantially hollow second tubular members telescopically mounted on each of said first hollow tubular members, said second hollow tubuar members being expansible and retractable relative to said first hollow tubular members, closure means extending across the lower ends of each of said second hollow tubular members, said closure means including a pair of substantially triangular support members pivotally connected on each of said second hollow tubular members adjacent an apex thereof, a closure wall for each pair of support members and extending immediately below the lowermost one of said second hollow tubular members, electromagnetic means including an armature, said electromagnetic means being pivotally connected on the lowermost one of each of said second hollow tubuar members, said armatures each being pivotally connected with one of each pair, respectively, of said support means, a normally open pressure-responsive electric switch disposed within the first of said tubular members remotely-disposed with respect to said feed hopper, a first series electric circuit including a source of E.M.F., the solenoid of a normally open relay switch, and said pressure-responsive switch, said pressure-responsive switch upon closing energizing said relay switch and closing the latter, a second series circuit connected in said source of E.M.F., said second circuit including said relay switch and said motor, and a third electric circuit connected to said source of E.M.F., said third circuit including a timer switch connected thereacross and the armatures of each of said electromagnetic means, the latter being connected in parallel across said timer switch.

4. Livestock feeding apparatus comprising an elongated conveyor including an elongated housing having a helicoidal screw extending axially therethrough, feed hopper means in open communication with said one end of said housing, drive means connected with said screw, said housing having a plurality of axially-spaced downwardly-opening cut-outs extending transversely therethrough, an open-ended spout depending from the peripheral margin of each of said cut-outs, a plurality of hanger collars fixedly secured to said housing at axially-spaced intervals, each of said collars having a stem depending therefrom, a discoidal plate mounted on each of said stems for rotation thereabout, each of said discoidal plates having a plurality of hollow tubular members depending therefrom and opening at their upper ends therethrough, said hollow tubular members being of lengths varying from one another, each of said spouts being disposed in the path of movement of the upper ends of said hollow tubular members and being adapted for alignment with one thereof, closure means for the lower end of said selected one of said hollow tubular members, and means on said selected one of said hollow tubular members for effecting actuation of said closure means to open the latter.

5. Livestock feeding apparatus comprising an elongated conveyor including an elongated housing having a helicoidal screw extending axially therethrough, feed hopper means in open communication with one end of said housing, drive means connected with said screw, said housing having a plurality of axially-spaced downwardly-opening cut-outs extending transversely therethrough, an elongated substantially hollow cylindrical spout depending from the peripheral marginal edge of each of said cutouts, a plurality of hanger collars fixedly connected on said housing at axially-spaced intervals, each of said collars having a stem depending therefrom, a discoidal plate mounted for rotation on each of said stems, means on said stem constantly biasing said discoidal plate for movement in an upward direction, a plurality of substantially hollow tubular members circumferentially-spaced about each of said discoidal plates and opening at their upper ends therethrough, said hollow tubular members having various axial dimensions but substantially identical diameters, said discoidal plate being movable to bring a selected one of said hollow tubular members in alignment with a selected one of said spouts, said discoidal member being shifted axially downwardly relative to said stem and movable upwardly to cause the selected one of said spouts to telescopically engage within the selected one of said hollow tubular members.

6. Livestock feeding apparatus as defined in claim 5, and closure means for the selected one of said hollow tubular members, said closure means including an elongated substantially cylindrical element adapted to be telescoped over the lower end of the selected one of said hollow tubular members, means detachably connecting said hollow cylindrical element on said selected one of said hollow tubular members, a pair of substantially triangular support members pivotally connected on said hollow cylindrical element, a closure wall fixedly connected to said support members and extending therebetween and across the lower end of said selected one of said hollow tubular members, and means connected with said support means operable to move said closure wall from across said lower end of the selected one of said hollow tubular members.

7. Livestock feeding apparatus comprising an elongated casing, a source of livestock feed including a hopper connected with said casing and in open communication therewith, means disposed in said casing to convey said feed from said hopper throughout the length of said casing, a first vertical discharge tube having a pair of opposed ends, said first vertical discharge tube having one of its said ends fixedly connected with said casing and being in open communication therewith, a second discharge tube having a pair of opposed ends, said second tube having an end thereof telescoped over the other end of said first discharge tube, feed discharge closure means pivotally mounted on the other end of said second tube and normally extending thereacross, and means mounted on said second tube connected with said feed discharge closure means to effect actuation of said discharge closure means to open said other end of said second tube, said second tube being adjustable relative to said first tube to provide a variable capacity feed means.

8. Livestock feeding apparatus as defined in claim 7, and time-control means connected with said actuating means.

9. Livestock feeding apparatus comprising an elongated casing, a source of livestock feed connected with said casing and disposed in open communication therewith, means disposed within said casing to convey said feed throughout substantially the entire length of said casing, a plurality of first vertical discharge tubes having a pair of opposed ends, said first vertical discharge tubes each having one of their respective ends fixedly connected with said casing and being in open communication therewith, a second discharge tube for each of said first discharge tubes, said second discharge tubes each having an end thereof telescoped over the other end of their respective first discharge tubes, feed discharge closure means pivotally mounted on each of said second tubes at the other end thereof, said closure means normally extending transversely across said other end of said second tubes, means mounted on said second tubes connected with said feed discharge closure means to effect actuation of said discharge closure means to open the other ends of said second tubes, said second tubes being adjustable with respect to their associated first tubes to provide variable capacity feed means, time-control means controlling said actuating means, and time-control means for effecting periodic operation of said conveyor means.

10. Livestock feeding apparatus comprising an elongated casing, a source of livestock feed connected with said casing and in open communication therewith, means disposed in said casing to convey said feed from said hopper throughout the length of said casing, said casing having a plurality of downwardly-opening axially-spaced cutouts extending transversely therethrough, volumetrically-adjustable means comprising a first vertical discharge tube for each of said cutouts, said first discharge tube having a pair of opposed ends with one of said ends being connected to said casing and in alignment with its said cutout, a second discharge tube for each of said first discharge tubes, said second discharge tubes having a pair of opposed ends and having an end thereof telescoped over the other end of said first discharge tube with which it is associated, said second discharge tubes being adjustable relative to said first discharge tubes to obtain a desired capacity of feed therein, each of said second tubes having closure means pivotally mounted thereon and normally extending across the other end of said second tubes, and means mounted on said second tubes to effect actuation of said closure means to open and close said other ends of said second tubes.

References Cited by the Examiner

UNITED STATES PATENTS

| | | | |
|---|---|---|---|
| 1,392,311 | 10/21 | Egeland | 119—52 |
| 2,285,765 | 6/42 | Carswell | 119—51 |
| 2,311,747 | 2/43 | Gooch | 119—51 |
| 2,681,639 | 6/54 | Littlefield | 119—52 |
| 2,940,639 | 6/60 | Winter | 119—51.11 |
| 2,969,769 | 1/61 | Paschall | 119—56 |
| 3,085,552 | 4/63 | Pilch | 119—52 |
| 3,144,173 | 8/64 | France et al. | 119—51.11 |

SAMUEL KOREN, *Primary Examiner.*

ALDRICH F. MEDBERY, *Examiner.*